United States Patent [19]

Stiff

[11] 3,958,397

[45] May 25, 1976

[54] TORQUE LIMITING DEVICES

[75] Inventor: Rodney A. Stiff, Bundaberg, Australia

[73] Assignee: Massey-Ferguson (Australia) Limited, Sunshine, Australia

[22] Filed: Mar. 6, 1974

[21] Appl. No.: 448,590

[30] Foreign Application Priority Data

Apr. 4, 1973  United Kingdom............... 16058/73

[52] U.S. Cl............................... 56/10.3; 192/56 L; 56/60
[51] Int. Cl.².................... A01D 75/18; F16D 7/02; F16D 43/21
[58] Field of Search............. 56/10.3, 60; 192/56 L, 192/56 R

[56] References Cited
UNITED STATES PATENTS

| | | | |
|---|---|---|---|
| 1,537,628 | 5/1925 | Street......................... | 192/56 R UX |
| 1,735,799 | 11/1929 | Smith............................ | 192/56 R X |
| 1,908,966 | 5/1933 | Falkiner et al....................... | 56/10.3 |
| 2,012,418 | 8/1935 | Burke.............................. | 192/56 R |
| 2,140,723 | 12/1938 | Spicer........................ | 192/56 R UX |
| 2,629,978 | 3/1953 | Krause et al............................ | 56/60 |
| 3,035,675 | 5/1962 | Lill................................... | 56/10.3 X |
| 3,434,271 | 3/1969 | Gaunt et al............................ | 56/60 |
| 3,673,774 | 7/1972 | Mizzi................................ | 56/60 X |

*Primary Examiner*—Paul E. Shapiro
*Attorney, Agent, or Firm*—Robert L. Farris

[57] ABSTRACT

Torque limiting device especially applicable to the drive train to cane chopping apparatus in a sugar cane harvester. Abutments associated with the friction members of a band type clutch abut when slip occurs and trip an over-centre device to release the drive. About 360° of slip can occur before the device trips. The drive is re-engaged by reversing the drive thereto.

9 Claims, 6 Drawing Figures

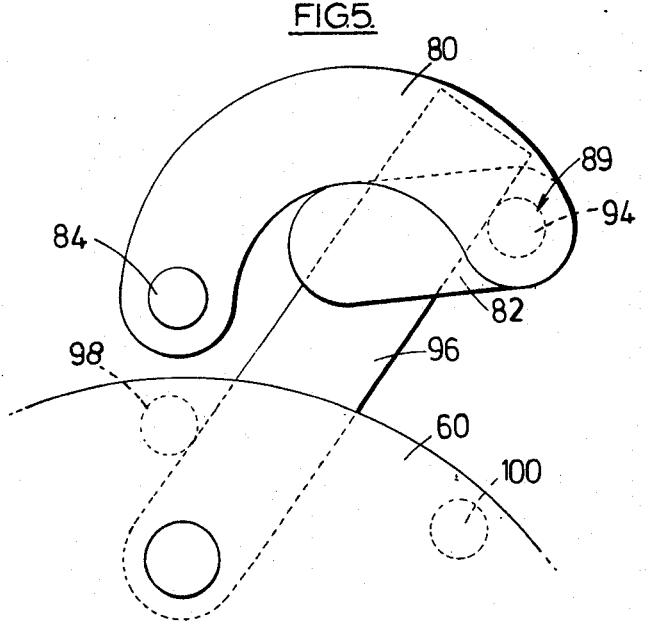
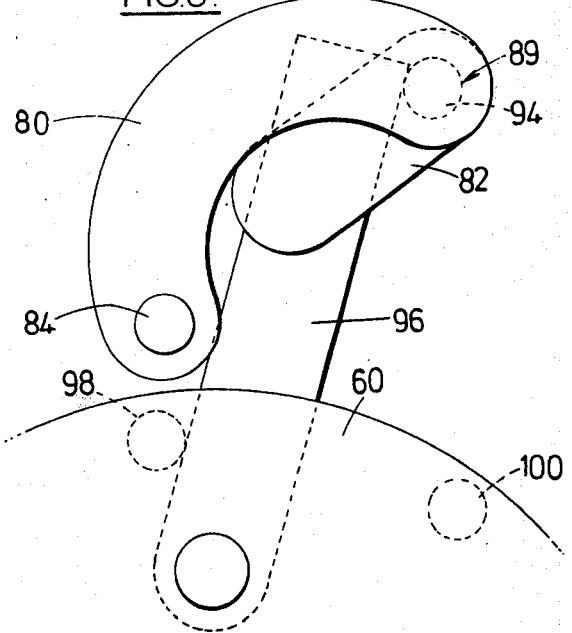

TORQUE LIMITING DEVICES

This invention relates to torque-limiting devices suitable for providing an upper limit to the torque which can be transmitted from a power source to apparatus driven by the power source. The invention is particularly, though not exclusively, applicable to crop harvesting machines such as sugar cane harvesters.

In sugar cane harvesters, shear pins have been provided to limit the torque which can be transmitted from the power plant to cane chopping apparatus. This is desirable to prevent damage to the chopping apparatus and other crop-processing machinery in the harvester and to prevent stalling of the power plant, by the ingress of large wads of cane or fencing posts or rocks for example. It will be appreciated that the cane chopping apparatus requires a maximum torque during each chopping action and a minimum torque between successive chopping actions and that the torque peaks recur at a fairly high frequency — depending on the rate of chopping. These torque characteristics taken together with the arduous conditions of use of a cane harvester and the widely varying thickness of the layers of cane to be chopped impose unique demands upon the drive train to the cane chopping apparatus.

A disadvantage of the use of shear pins for transmitting drive to cane chopping apparatus in a sugar cane harvester is that in order to provide protection for the chopping apparatus from damage by rocks or stones, the shear pin has to be of such shear strength that it tends to shear too readily under conditions of crop overload. When an overload of cane which is slightly larger than usual reaches chopping apparatus protected by such a shear pin, the shear pin may well shear, whereas the power plant and other apparatus of the harvester may be capable of handling the overload if the drive could be maintained to the chopping apparatus a little longer. Another disadvantage of shear pins is the considerable time and labour involved in replacing a shear pin after it has sheared. It is often not possible for machinery designers to locate shear pins in readily accessible places.

An object of the invention is to provide a torque limiting device in which one or both of the above disadvantages is mitigated or overcome.

According to the invention there is provided a torque limiting device comprising first and second friction elements, a control mechanism operable to effect driving engagement of the friction elements and to effect release thereof whereby drive may be established and interrupted respectively between the friction elements, and slip responsive means associated with the control mechanism and operative to cause the control mechanism to interrupt drive between the friction elements when slip occurs therebetween, characterized in that said slip responsive means comprises a first abutment associated with said first friction element and a second abutment associated with said second friction element, one of said abutments being connected to said control mechanism, said abutments being engageable, when slip occurs between said friction elements, so as to transmit to said control mechanism a thrust effective to interrupt said drive.

The invention also provides a crop harvesting machine having drivable crop treatment apparatus, the drive to the crop treatment apparatus being transmitted through a torque-limiting device as defined in the last preceding paragraph. The crop harvesting machine may be in the form of a sugar cane harvester in which the said crop treatment apparatus comprises cane chopping apparatus. Alternatively the crop harvesting machine may be in the form of a baler.

An embodiment of the invention will now be described by way of example with reference to the accompanying drawings in which:

FIGS. 5 and 6 illustrate, somewhat diagrammatically, in views similar to that of FIG. 4, two stages in the operation of the torque-limiting device.

Figure 1:
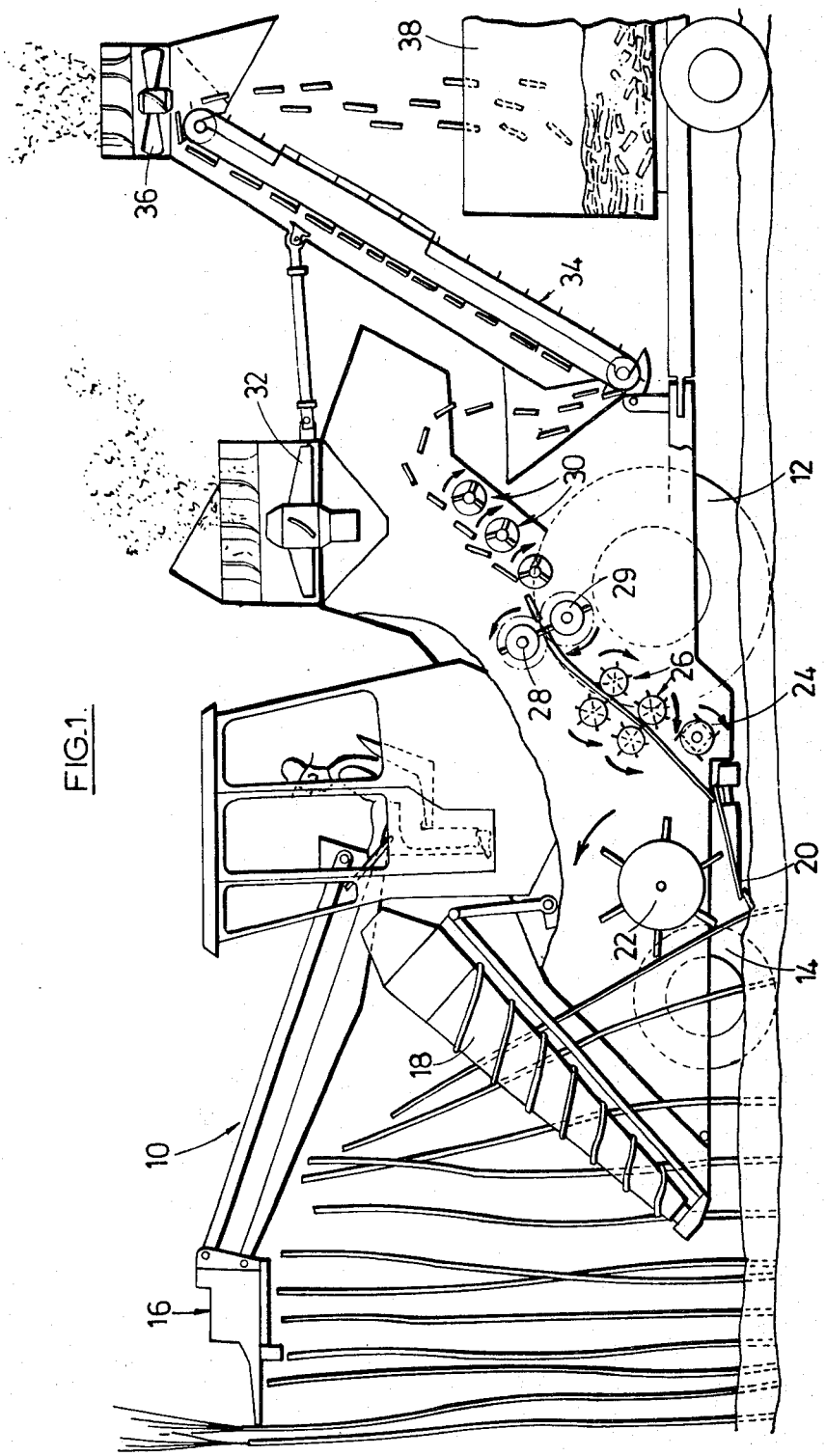
FIG. 1 shows a sugar cane harvester in side elevation. The harvester is shown partly sectioned to reveal details of its crop treatment apparatus.

A sugar cane harvester 10 comprises power-driven rear wheels 12 and forward steerable wheels 14. A top-cutting unit 16 removes cane tops, and the cane is fed between a pair of power-driven crop lifters 18. A pair of contra-rotating base cutter discs 20 sever the canes slightly below ground level and they are fed rearwards butt-first, by a large paddle-type roller 22. A butt-lifter roller 24 directs the cane towards two pairs of feeding and cleaning paddle-type rollers 26 and the canes then pass between a pair of contra-rotatable chopper elements in the form of chopper drums 28, 29 which cut the canes into billets about 1 foot long. Drums 28, 29 are driven in timed relationship and each drum carries an axially extending blade which coacts with the blade on the other drum to cut the canes fed therebetween.

The billets cascade over three power driven flipper rollers 30 through a trash removal zone where a fan 32 removes trash, and fall onto an elevator 34. At the top of elevator 34 the billets cascade through a further trash removal zone where a fan 36 removes the remainder of the trash, and they fall into a trailer 38.

Figure 2:
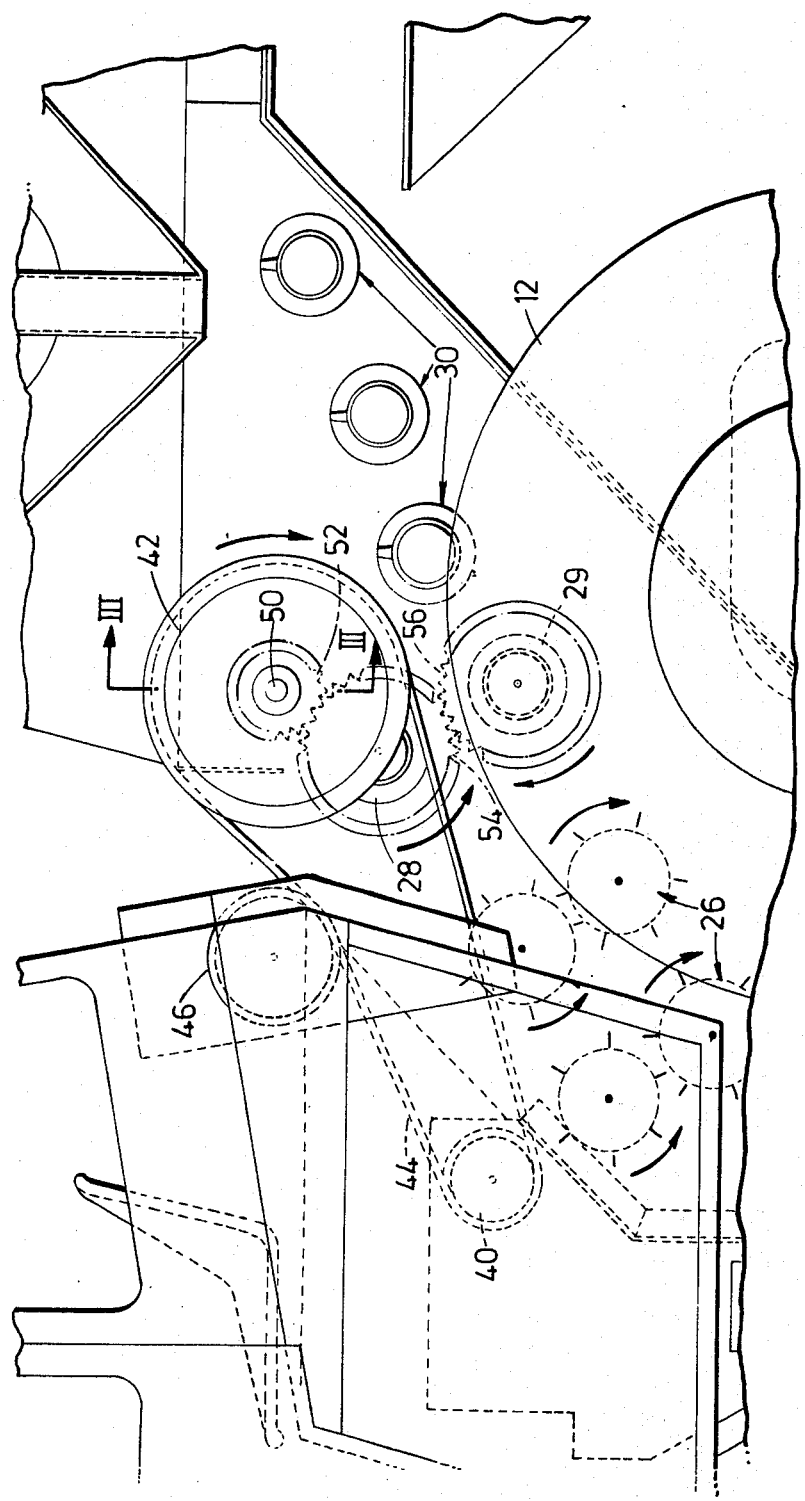
FIG. 2 shows in side elevation part of the harvester of FIG. 1 on a larger scale. This Figure shows the drive train to cane chopping apparatus on the harvester.

As shown in FIG. 2, upper chopper drum 28 is driven from a vee belt main drive pulley 40 which is connected through a gearbox (not shown) to the engine (not shown) of the cane harvester. Drive pulley 40 drives a driven flywheel pulley 42 through a multi-vee belt 44 tensioned by a jockey pulley 46 and engaging multiple vee ribs 45 (FIG. 3) on pulley 42. Drive is transmitted from driven pulley 42 through a torque limiting device 48 (FIGS. 3, and 4) to a driven shaft 50 carrying a pinion 52 which meshes with a peripheral ring gear 54 at one axial end of upper chopper drum 28.

A similar peripheral ring gear 56 at one axial end of lower chopper drum 29 meshes with the ring gear 54 on upper drum 28 whereby the lower drum contra-rotates with respect to the upper drum.

Pulley 42 together with an integral portion 58 thereof constitute a flywheel for the purpose of smoothing the intermittent power demands of chopper drums 28, 29 as they rotate.

Figure 3:
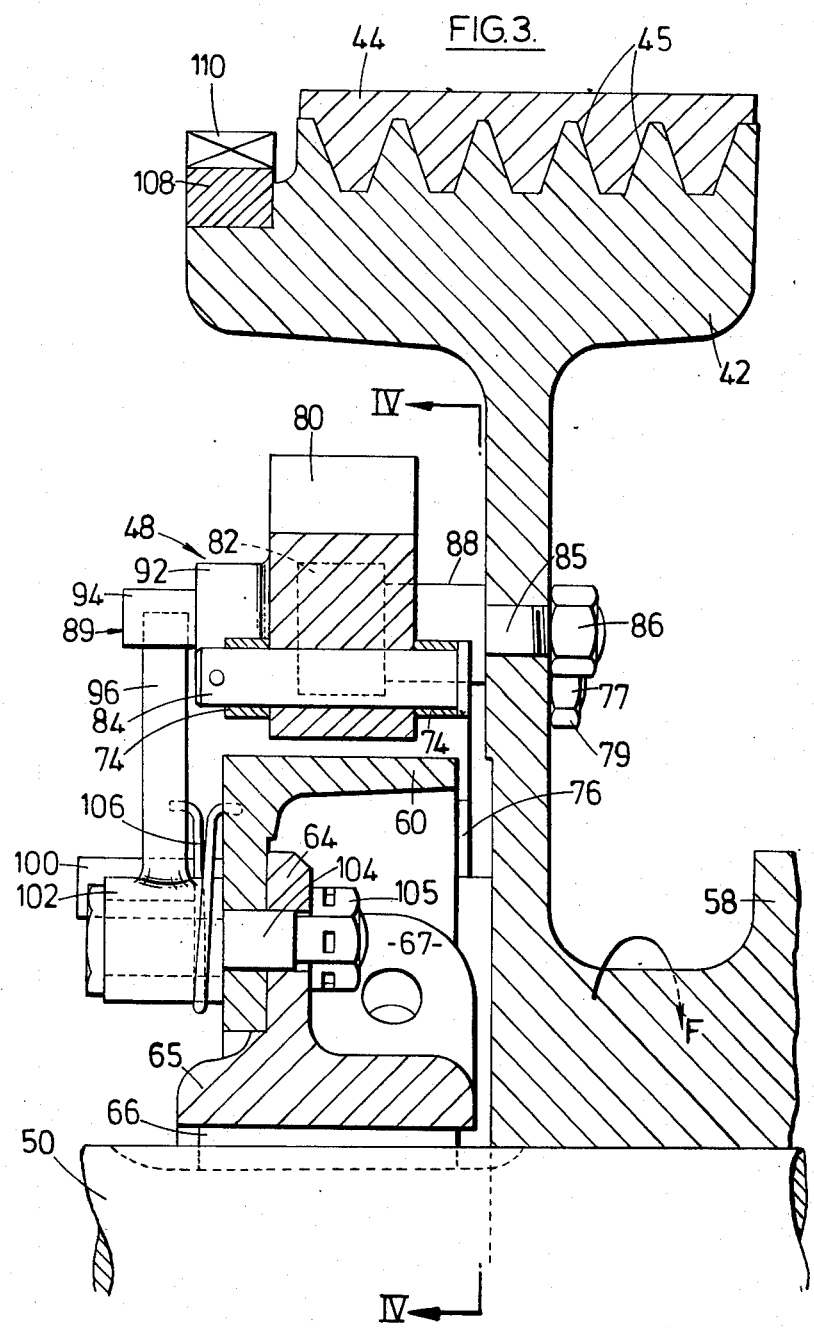
FIG. 3 shows a section on the lines III—III in FIGS. 2 and 4 through a torque limiting device which transmits drive to the cane chopping apparatus.
Figure 4:
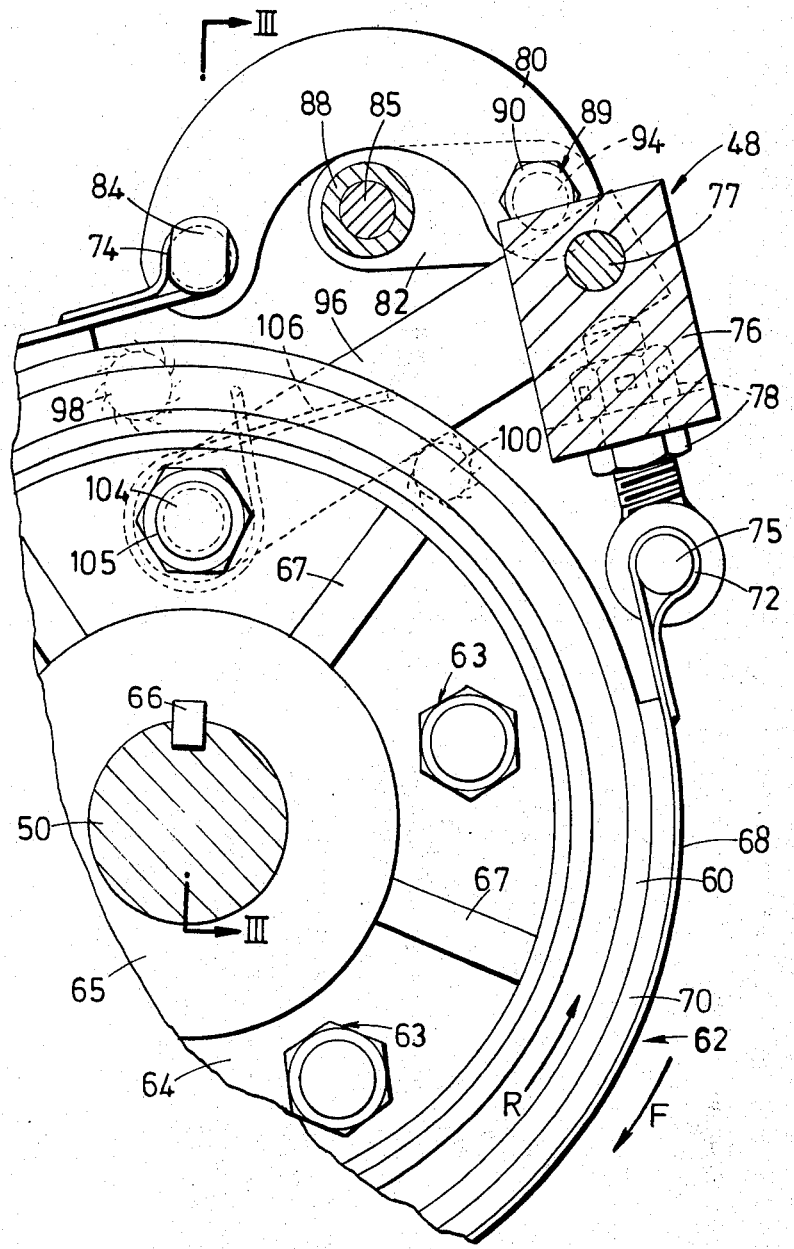
FIG. 4 shows a sectional view on the line IV—IV in FIG. 3.

Referring to FIGS. 3 and 4, torque limiting device 48 comprises first and second friction elements in the form of a cylindrical friction drum 60 and a band-type friction member 62 extending round the drum, respectively. The friction drum is secured by nut and bolt assemblies 63 to a radially-projecting flange 64 on a collar 65 which is itself coupled to driven shaft 50 by a key 66. Flange 64 is reinforced by a series of radial webs 67.

Friction band 62 comprises a flexible outer steel tension band 68 and an inner lining 70 of friction material bonded thereto. Tension band 68 is formed with two pairs 72, 74 of spaced loops, one pair at each end. The loops 72 at one end of the friction band are fixed to pulley 42 through a threaded T-bolt 75 which is connected by adjuster nuts 78 to an L-shaped bracket 76 secured by a bolt 77 and nut 79 to the pulley.

A control mechamism operable to effect driving engagement of the friction elements and to effect release thereof comprises an over-centre device connecting the other end of friction band 62 to flywheel 42. The over-centre device comprises a long curved link 80 and a short straight link 82. One end of long link 80 is pivotally connected by a pin 84 to the loops 74 at that end of friction band 62. One end of short link 82 is pivotally connected to pulley 42 by a bolt 85 and an associated nut 86 and a spacer 88 welded to the link. The other end of short link 82 fits into a bifurcated portion at the other end of long link 80 and is pivotally connected thereto by a striker bolt 89. The striker bolt has a hexagonal head 90 (FIG. 4), a threaded midshank portion engaging a threaded sleeve 92 welded onto one side of the bifurcated end of long link 80, and a projecting unthreaded striker portion 94.

Links 80, 82 can move over-centre between the positions shown in FIGS. 5 and 6 in which, respectively the band-type clutch constituted by the friction elements 60, 62 is engaged and disengaged.

A slip responsive mechanism for moving the links 80, 82 over-centre when slip occurs between friction elements 60, 62 is provided, comprising a first abutment in the form of a striker arm 96 mounted on friction drum 60, and a second abutment constituted by portion 94 of striker bolt 89. Striker arm 96 is formed with a sleeve 102 at one end through which a bolt 104 carrying a nut 105 extends, whereby the arm is pivotally mounted on drum 60 for limited angular movement between two circumferentially spaced stops 98, 100 which project axially from drum 60 adjacent its periphery. Bolt 104 and nut 105 constitute one of the nut and bolt assemblies 63.

Striker arm 96 is proportioned for engagement with striker portion 94 of the striker pin 89 and is biased towards stop 98 by a torsion spring 106 mounted on sleeve 102 and acting between drum 60 and the striker arm.

An annular gear member 108 having gear teeth 110 is fixed to the outer periphery of pulley 42 at its axially inner side to mesh with the pinion (not shown) of a hydraulic rewind motor (not shown) for a purpose to be described.

In use, with torque limiting device 48 in its engaged condition as shown in FIG. 5, drive is transmitted from the cane harvester's engine to the chopper drums 28, 29 via main drive pulley 40, multiple vee belt 44, flywheel pulley 42, torque limiting device 48, shaft 50 and pinion 52.

When the chopper drums become overloaded by, for example, an unduly large wad of cane, the torque limiting device operates to disengage the band-type clutch 60, 62 thereby interrupting the drive to the chopper drums. This occurs as follows.

During normal working, and before the overload occurs, the overcentre mechanism comprising links 80, 82 maintains a tension in tension band 68 such as to hold friction lining 70 in engagement with clutch drum 60. The magnitude of this tension is determined by the setting of adjuster nuts 78. Drive is transmitted to drum 60 and hence to shaft 50 from flywheel pulley 42 via bolt 85, so as to rotate the drum in a clockwise direction as seen in FIGS. 4, 5 and 6 and as indicated by arrow "F" in FIGS. 3 and 4. In the drawings, arrows "F" and all unlabelled arrows indicating directions of rotation refer to normal forward operation of the mechanism as opposed to reverse operation thereof which is referred to hereafter in connection with arrow "R" in FIG. 4.

When overload occurs, clutch band 62 begins to slip relative to clutch drum 60, in a clockwise direction as seen in FIGS. 4 and 5, from the position shown in FIG. 5 towards the position shown in FIG. 4. After about 350° of angular movement or slipping, the striker portion 94 of the striker pin 89 engages striker arm 96 and slip continues as arm 96 pivots clockwise about bolt 104 against the action of spring 106 until, after a total of just over 360° of slip, the arm 96 engages stop 100 fixed to drum 60. This position is shown in FIG. 4.

Stop 100 prevents any further angular movement of striker arm 96 in a clockwise direction as seen in FIG. 4 about bolt 104. Therefore as slip continues between the clutch band 62 and the clutch drum 60, striker arm 96 trips the torque limiting device by moving the links 80, 82 over-centre towards the attitude shown (by the links 80, 82 only) in FIG. 6, thereby releasing the tension in tension band 68 and disengaging the clutch and allowing the portion 94 of the striker pin to move past the end of striker arm 96. Pulley 42 now rotates freely in a clockwise direction as seen in FIG. 4, relative to shaft 50. The clutch band 62 and the links 80, 82 rotate freely with the pulley. The clutch drum 60 is held stationary by the overload on the chopper drums 28, 29. As the clutch band rotates, the end 94 of the striker pin engages the striker arm on each revolution but is able to move past the arm by deflecting it clockwise about bolt 104 against the action of torsion spring 106.

On detecting the interruption of drive to the chopper drums, the driver of the cane harvester stops the drive to pulley 42 and operates the hydraulic motor (not shown) to cause the rewind pinion (not shown) which meshes with annular gear 108 to rotate flywheel pulley 42 in the direction opposite to that of its normal in-use rotation, as indicated by arrow "R" in FIG. 4.

Rotation of pulley 42 in the direction "R" brings the end 94 of the striker pin against striker arm 96 as shown in FIG. 6. The striker arm abuts stop 98. Continued reverse rotation of the pulley causes a torque to be applied to the linkage 80, 82 through bolt 85 and the striker pin, which moves the linkage over-centre and re-tensions tension band 68. The arrangement of the striker arm 96, striker pin end 94, linkage 80, 82 and stops 98, 100 is then as indicated in FIG. 5. This is the arrangement of the parts during normal working i.e., before overload occurs.

Thus the band clutch has now been re-engaged and continued reverse rotation of pulley 42 by the rewind pinion causes reverse rotation of the chopper drums 28, 29 and the cane or other material which caused the overload is fed forwards out of the cane harvester, thereby clearing the blockage.

Once the blockage has been cleared, harvesting can recommence. The clutch of the torque limiting device is already in its drive condition (FIG. 5) so the driver merely reconnects the drive to main drive pulley 40 and harvesting proceeds.

It will be appreciated that the embodiment of the invention described above not only constitutes a simple mechanism for protecting the chopper drums against overloading by the kinetic energy stored in flywheel 42, it also provides simple reconnection of the drive after overload, when the drive to the chopper drums is reversed. Thus there is no need for the operator to leave his cab when a blockage occurs. A further advantage of the mechanism resides in the fact that momentary overloads do not trip the over-centre mechanism because, from the normal working position shown in FIG. 5, the pulley 42 and links 80, 82 have to slip relative to drum 60 through about 360° before they reach the position shown in FIG. 4 in which the linkage is about to be moved over-centre.

The total 360° of slip need not occur all at once, it may be made up of several small slips each arising from quite separate overloads, each of short duration. The mechanism does not trip until the sum of these slips brings striker arm 96 and striker pin portion 94 into engagement.

A further advantage is that the torque at which slip occurs can easily be adjusted by means of the adjustment nuts 78 (FIG. 3).

The invention is not limited to the details of the embodiment described above and in particular it is to be noted that:

1. the abutments (corresponding to striker arm 96 and striker pin portion 94) need not be mounted directly on the friction elements of the clutch. For example the abutments could be merely drivingly connected to their respective friction elements; and
2. the connection which is provided between the abutment corresponding to striker pin portion 94 and the control mechanism, for the purpose of tripping the device, need not be a direct connection. For example any suitable mechanical, fluidic or hydraulic connection could be provided.

We claim:

1. A crop harvesting machine having drivable crop treatment apparatus characterized in that the drive to the crop treatment apparatus is transmitted through a torque-limiting device comprising first and second friction elements, a control mechanism operable to effect driving engagement of the friction elements and to effect release thereof whereby drive may be established and interrupted respectively between the friction elements and actuating means operably attached to the first and second friction elements for actuating the control mechanism to interrupt drive between the first and second friction elements in response to relative movement between the first and second friction elements in one direction.

2. The crop harvesting machine of claim 1 wherein the actuating means attached to the first and second friction elements actuates the control mechanism to establish drive between the first and second friction elements in response to relative movement between the first and second friction elements in another direction.

3. The crop harvesting machine of claim 1 wherein the control mechanism is mounted for rotation with the friction elements.

4. The crop harvesting machine of claim 1 wherein the control mechanism includes an overcenter device.

5. The crop harvesting machine of claim 4 wherein the overcenter device is attached to the first friction element and said first friction element includes a band type friction member.

6. The crop harvesting machine of claim 4 wherein the actuating means includes an abutment on the overcenter device of the control mechanism, an actuating arm pivotally mounted on the second friction element and an abutment on the first friction element which engages the actuating arm during relative movement between the first and second friction elements in said one direction, pivots the actuating arm into contact with the abutment on the overcenter device of the control mechanism and releases the overcenter device to interrupt drive between the first and second friction elements.

7. The crop harvesting machine of claim 6 wherein the actuating arm can move past the abutment on the overcenter device when drive between the first and second friction elements is interrupted.

8. The crop harvesting machine of claim 6 wherein the actuating means includes a second abutment on the first friction element which engages the actuating arm during relative movement between the first and second friction elements in another direction, pivots the actuating arm into contact with the abutment on the overcenter device of the control mechanism and moves the overcenter device to establish drive between the first and second friction elements.

9. The crop harvesting machine of claim 4 wherein the overcenter device includes a toggle linkage.

* * * * *